(12) United States Patent
Breugelmans et al.

(10) Patent No.: US 11,823,045 B2
(45) Date of Patent: Nov. 21, 2023

(54) ENCODING AND DECODING APPARATUS

(71) Applicant: Sony Interactive Entertainment Inc., Tokyo (JP)

(72) Inventors: Mark Jacobus Breugelmans, London (GB); Oliver Hume, London (GB); Fabio Cappello, London (GB); Nigel John Williams, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 354 days.

(21) Appl. No.: 17/074,827

(22) Filed: Oct. 20, 2020

(65) Prior Publication Data
US 2021/0124996 A1 Apr. 29, 2021

(30) Foreign Application Priority Data
Oct. 24, 2019 (GB) ..................................... 1915421

(51) Int. Cl.
*G06N 3/08* (2023.01)
*G06V 10/30* (2022.01)
(Continued)

(52) U.S. Cl.
CPC .............. *G06N 3/08* (2013.01); *G06F 18/214* (2023.01); *G06F 18/241* (2023.01);
(Continued)

(58) Field of Classification Search
CPC ....... H04N 1/4486; G06T 5/001; G06T 9/002; G06T 2207/20081; G06T 5/002;
(Continued)

(56) References Cited

U.S. PATENT DOCUMENTS 5,768,426 A 6/1998 Rhoads
6,065,119 A * 5/2000 Sandford, II ...... H04N 1/32144
726/22
(Continued)

FOREIGN PATENT DOCUMENTS

CN 109818739 A * 5/2019
EP 1887513 A2 * 2/2008 ....... G06F 17/30241
EP 3812944 A1 4/2021

OTHER PUBLICATIONS

Examination Report for corresponding GB Application No. 1915421. 0, 3 pages, dated Jan. 21, 2022.
(Continued)

*Primary Examiner* — Sumati Lefkowitz
*Assistant Examiner* — Michael Adam Shariff
(74) *Attorney, Agent, or Firm* — Matthew B. Dernier, Esq.

(57) ABSTRACT

An encoding apparatus is provided. The apparatus comprises an input unit operable to obtain a plurality of training images, said training images being for use in training a machine learning model. The apparatus also comprises a label unit operable to obtain a class label associated with the training images; and a key unit operable to obtain a secret key for use in encoding the training images. The apparatus further comprises an image noise generator operable to generate, based on the obtained secret key, noise for introducing into the training images. The image noise generator is configured to generate noise that correlates with the class label associated with the training images such that a machine learning model subsequently trained with the modified training images learns to associate the introduced noise with the class label for those images. A corresponding decoding apparatus is also provided.

15 Claims, 4 Drawing Sheets

(51) Int. Cl.
  *G06V 10/40* (2022.01)
  *G06F 21/62* (2013.01)
  *H04N 1/44* (2006.01)
  *G06F 18/214* (2023.01)
  *G06F 18/241* (2023.01)
  *G06V 10/764* (2022.01)
  *G06V 10/82* (2022.01)

(52) U.S. Cl.
  CPC .......... *G06F 21/6218* (2013.01); *G06V 10/30* (2022.01); *G06V 10/40* (2022.01); *G06V 10/764* (2022.01); *G06V 10/82* (2022.01); *H04N 1/4486* (2013.01)

(58) Field of Classification Search
  CPC ............... G06T 5/10; G06T 2201/0051; G06T 2201/0052; G06T 2207/20052; G06T 1/0021; G06T 1/005; G06T 2207/20084; G06F 21/16; G06F 21/6218; G06F 21/62; G06F 21/00; G06F 21/10; G06F 21/12; G06F 21/14; G06F 21/60; G06K 9/6256; G06K 9/6268; G06K 9/6267; G06V 10/774; G06V 10/764; G06V 2201/10; G06V 10/30; G06V 10/70; G06V 10/82; G06N 20/00; G06N 3/02; G06N 3/08
  See application file for complete search history.

(56) References Cited

U.S. PATENT DOCUMENTS

| | | | |
|---|---|---|---|
| 7,725,718 B2 | 5/2010 | Langford | |
| 2020/0410404 A1* | 12/2020 | Imani | H04L 9/085 |

OTHER PUBLICATIONS

Extended European Search Report for corresponding EP Application No. 20201608.5, 9 pages, dated Mar. 23, 2021.

UR Rehman Atique, et al., "End to End Trained CNN Encoder-Decoder Networks for Image Steganography" Advances in Databases and Information Systems, Lecture Notes in Computer Science, Springer International Publishing, pp. 723-729, Jan. 23, 2019.

Phil Sallee ED, et al., "Model-Based Steganography" Digital Watermarking; Lecture Notes in Computer Science, pp. 154-167, (Jan. 2004).

Chehhad A, et al., "Digital Image Steganography: Survey and Analysis of current Methods" Signal Processing, Elsevier Science Publishers vol. 90, No. 3, pp. 727-752, Mar. 1, 2010.

Kadhim Inas Jawad, et al., "Comprehensive surveys of image steganography: Techniques, Evaluations, and Trends in Future Research" Neurocomputing, vol. 335, pp. 299-326, Mar. 1, 2019.

Hussain Mehdi et al., "Image Steganography in spatial domain: A survey" Signal Processing Image Communication, vol. 65, pp. 46-66, Jul. 1, 2018.

Combined Examination and Search Report for corresponding GB Application No. GB1915421.0, 6 pages, dated Mar. 16, 2020.

Communication Pursuant to Article 94(3) for corresponding Application No. EP 20201608.5, 7 pages, dated Mar. 1, 2023.

Nagham Hamid, "Steganography in image files: A Survey," Australian Journal of Basic and Applied Sciences, 7(1): pp. 35-55, Dec. 31, 2013 (for relevancy see Non-Pat. Lit. #1).

* cited by examiner

{+2, 0, +3; +1, +1, 0; 0, 0, +3}

ENCODING AND DECODING APPARATUS

TECHNICAL FIELD

The present disclosure relates to an encoding and decoding apparatus for encoding and decoding training images that are to be used in training a machine learning model.

BACKGROUND

It is known in the art that machine learning can be used to perform image classification. Image classification involves predicting the class of an object in an image, based on the output of a trained machine learning model. Typically, the machine learning model is trained with labelled training images, where the label provides an indication of a class of object that is present in the image. The machine learning model then learns the salient image features that are representative of a given class of object (i.e. via so-called 'supervised learning'). Currently, convolutional neural networks are popular for performing this type of image classification.

Typically, to train a machine learning model to learn a class label for a given image of an object, a large number of training images of that object are needed. This is so that the machine learning model can learn a generic representation of the object that corresponds with the class label.

In some cases, training images are subject to a license. For example, where the images are of people and some degree of consent is required, or where e.g. the images cannot easily be obtained elsewhere. The use of a license provides the copyright owner with a degree of control over how the training images are used. It may be desirable to exert this control to ensure that the training images are not used for malicious purposes. Deepfake, for example, uses artificial intelligence to superimpose faces of one person (typically a celebrity) onto the face of another. This can result in the creation of potentially offensive video content, as well as false news. The use of Deepfake on a given target requires a user to accumulate a large number of training images of the target's face, so that an encoder can learn a representation of the target's face in latent space, that can be subsequently mapped to the face of another person. Clearly, it would be desirable to interfere with the use of Deepfake on images where the third party has not obtained consent from the relevant party.

In other examples, it may be useful to know whether an unauthorized user has used licensed training images in training their model, without necessarily preventing them from using the images. This may be the case, where, a copyright owner intends to prove that a third party has used the training images without their consent.

More generally, it may be desirable to interfere with an unauthorized party's ability to train an artificial intelligence to recognize a given object or person in an image. For example, a person may not wish for a system to be able to recognize who they are, at least not without having provided their consent in advance.

It is known in the art that small perturbations can be introduced into an image so as to fool a trained classifier into misidentifying an object in the image. Typically, this involves using a substitute neural network to generate an adversarial image that is capable of fooling the original classifier. However, in order to work effectively, knowledge of the original classifier is usually required, or at least an attempt to reproduce its behaviour must be made. As will be appreciated, recreating the behaviour of a trained neural network (the classifier) can be intensive in terms of the processing and computing power required.

It is also known in the art that a sticker can be inserted into a scene with a target object so as to prevent an image classifier from being able to classify the target object. An example of such a sticker is described in 'Adversarial Patch', T. Brown et. al (https://arxiv.org/pdf/1712.09665.pdf), pages 1-6. However, as will be appreciated it may not always be convenient for a party to insert such a sticker into a scene, particularly not where a large number of images of a given target object are required. Moreover, a party may not wish to pollute their images with such an obvious interruption of the image content.

The present invention seeks to address or at least alleviate some of the above identified problems.

SUMMARY

The present disclosure is defined by the appended claims.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
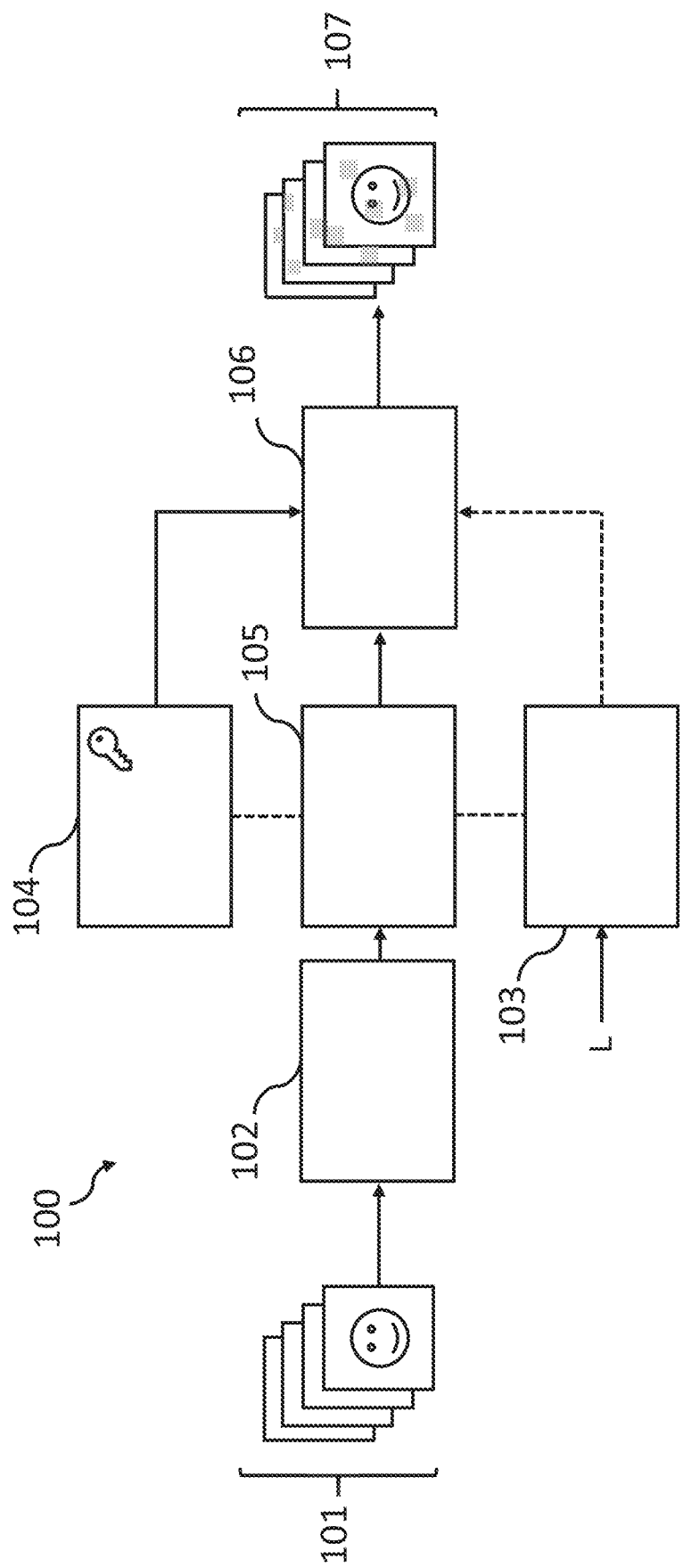
FIG. 1 shows schematically an example of an encoding apparatus for encoding training images.

FIG. 1 shows schematically an example of an encoding apparatus 100 for encoding training images 101. Here, the term 'training images' is used to refer to a plurality of images of a subject that are suitable for training a machine learning model to learn a feature representation of the subject. The feature representation may be subsequently used to train an image classifier, for example. In some examples, the training images 101 may comprise more than one subject. This may be the case where e.g. object localization and segmentation is to be performed on the training images 101, prior to being input to a classification model.

The training images 101 may correspond to a set of images, with each image in a set being, as a non-limiting example, of the same subject; with one or more of the pose, lighting, colour, image resolution, accessories, viewpoint, associated with the subject varying across the set. Although, in some examples, the variation in these aspects of the training images 101 may be limited. For example, it is easier to train Deepfake with video frames that with little variation in terms of lighting, skin tone, etc., and so the training images 101 may correspond to such video frames.

A given set of training images 101 may be associated a class label; that is, each image may be labelled, with the label providing an indication of the subject in those training images 101. In some examples, the training images 101 in a given set may comprise more than one subject, and so be associated with more than one class label.

The encoding apparatus 100 comprises an input unit 102, label unit, a key unit 104, an image noise generator 105 and an image processor 106. In FIG. 1, a plurality of training images 101 are shown as being input to the encoding apparatus 100 (specifically, to the input unit 102) and a plurality of modified training images 107 are shown as being output by the encoding apparatus. The generation of the modified images 107 is described below.

The input unit 102 is configured to obtain a plurality of training images 101. As described above, the training images 101 correspond to images of a subject or subjects that may be used by a machine learning model to learn a respective feature representation of that subject or subjects. The training images 101 may comprise RGB or YUV images, or RGB video frames that have been extracted from an .MPEG file, for example. The training images 101 may be obtained from a database in which the training images 101 are stored. For example, the training images 101 may be downloaded from a server that is in communication with the input unit 102.

The label unit 103 is configured to obtain a class label for the plurality of training images 101. In some examples, a class label may be stored in association with the training images 101. For example, each image may be associated with metadata that provides an indication of what the training images 101 are of. The class label for a given set of training images 101 may therefore be obtained by downloading the training images 101 and extracting the metadata associated therewith.

In some examples, the metadata may correspond to hashtags that have been used to label the images 101. Some content hosting platforms allow users to mark up their images/videos in this way, and so a class label may implicit from the hashtags associated with a given image or video. In other examples, the training images 101 may not be pre-labelled and e.g. a developer may manually mark up the images with metadata, indicating a class label for the training images 101. The manual marking up of the images may be performed based on prior knowledge of what the training images 101 are of.

In some examples, the training images 101 may not necessarily be 'clean' in that they can not immediately be used for training an artificial intelligence to learn a feature representation of a given subject in the images. For example, the training images 101 may be of several different subjects (e.g. in the case of a video file that includes scene changes, different characters, etc.), and so a degree of pre-processing may be required. The pre-processing may involve, for example, performing unsupervised learning (e.g. k-mean clustering) on the training images 101 so as to identify groups of images having similar content and therefore being likely to correspond to the same image subject. The different groups of images can then be reviewed by e.g. a data scientist and assigned a class label based on what the images in a given group seem to correspond to. Hence, the training images 101 input to the input unit 102 may be a subset of a larger set of training images 101.

The encoding apparatus 100 also comprises a key unit 104 that is configured to obtain or contain a secret key for use in encoding the training images 101. The secret key may correspond to a single cryptographic key that can be used for encryption (i.e. symmetric-key algorithms). A corresponding version of the key may also be stored at a corresponding decoding apparatus. Alternatively, or in addition, the key may correspond to a private or public key that can be used in asymmetric-key encryption. A corresponding public or private key (depending on which is used for the encryption) may be stored at a corresponding decoding apparatus. The decoding apparatus will be discussed later, in relation to FIG. 3.

The key unit 104 may correspond to a key generator that is operable to generate secret keys for encoding the training images 101. For example, the key unit 104 may correspond to an encryption key server, or an application such as e.g. Tivoli® Storage Manager, or a utility such as keytool, for generating secret keys. In some examples, the key unit 104 may be operable to receive a secret key that has been generated by a separate key generator that is not part of the encoding apparatus. The secret key may correspond to a random string of bits.

In some examples, the key unit 104 is configured to obtain a secret key that is specific to the class associated with a given set of training images, as will be described later. For example, the key unit may be operable to receive an input from the label unit, and in response thereto, obtain a secret key that is specific to that class label. If a training image is associated with multiple class labels, e.g. due to having multiple subjects, then the key unit may be configured to obtain a secret key for each class label associated with a given training image.

In some examples, the key unit 104 is operable to obtain a plurality of different secret keys, with each secret key being used to encode a different training image. In such examples, the class label may be used in combination with the secret key for each training image to ensure that class-specific information is introduced into the training images as noise. The use of the keys in encoding the images will be described later. Here, the term 'encode' is used to describe the generation of modified training images from an original set of training images 101.

Generally, a secret key may be used for at least one of generating noise for introducing into the images and determining a spatial distribution of the noise in the training images 101, as described below.

The encoding apparatus 100 further comprises an image noise generator 105 operable to generate noise for introducing into the training images 101. The noise may comprise a pattern of variations in pixel intensities and/or pixel colour(s) that are to be introduced into the obtained training images 101. A variation in pixel colour corresponds to a variation in the intensity of a given colour. For example, for an RGB image, a variation in one or more of the R, G and B values of a given pixel. The variations in pixel intensity and/or pixel colours may be defined in relative terms, e.g. relative to the existing pixel information for the training images 101. Alternatively, the variations in pixel intensity and/or pixel colours may be absolute. For example, the noise may consist of a pattern of pixel colours and/or intensities, with the pattern being independent of the training images 101.

In some examples, the noise may comprise a periodic pattern, wherein the periodicity of the pattern varies in accordance with one or more noise frequencies. The pattern may be persistent throughout the training images 101 or localized to one or more specific regions. The noise generated by the image noise generator 105 may correspond to a signal that is to be convoluted with a representation of the training images in the frequency domain (e.g. a Discrete Cosine Transform).

In some examples, the noise generated by the image generator 105 may be equivalent to applying a filtering operation to the training images in the frequency domain. For example, the noise may correspond to the application of e.g. a low band, high band, Sobel, Butterworth, Gaussian filter, or the like to the training images. Although, as will be appreciated it may be desirable to modify the images in a way that is imperceptible to a viewer. Hence one or more filters that result in subtle changes to the training images may be selected by the image noise generator 105 and applied to the training images 101.

In some examples, the frequency (or frequencies) of the noise introduced into the images may be linked with the secret key (or secret key and class label), such that a user in possession of the secret key (or secret key and class label) is able to determine the frequency (or frequencies) of the signal introduced into the image. For example, the degree and/or spatial placement of perturbations to the image may be a function of one or more frequencies; for example, key data may be used to select frequency component values that result in a corresponding spatial pattern (e.g. using FM synthesis). This pattern may be used to peturb the image, or act as an envelope for noise perturbing the image. The same or different frequency component values may be used for x and y direction patterns to generate a 2D perturbation pattern on the image. Alternatively or in addition, key data may be used to drive random selection of points that may be perturbed, where the probability of point selection follows spatial peaks and troughs at one or more frequencies; the frequencies and optionally the peaks and troughs may be responsive to the key data, so that the distribution comprises an underlying spatial probability distribution that relates back to the key data.

Alternatively, or in addition, the noise may comprise a discrete pattern (that is not necessarily periodic) that is introduced at a plurality of different locations in the images 101. The spatial distribution of the pattern in the images may be determined based on a class label and secret key, or a class label-specific secret key, as will be described later. It will be appreciated that the spatial distribution my thus comprise specific locations at which to introduce the noise pattern, or may refer to a continuous distribution in terms of type, intensity, and/or probability of introduced noise.

In FIG. 1, the image noise generator 105 is shown as receiving an input from the input unit 102. This may correspond to the image noise generator 105 receiving the training images 101 as an input, so as to adjust the pixel intensity and/or colours at one or more spatial locations.

The image noise generator 105 is configured to generate noise that correlates with the class label obtained for the plurality of training images 101, such that a machine learning model subsequently trained with the noisy images learns to identify the noise as corresponding to the class label. The noise 'correlates' with the class label in that, for a given set of training images 101 (having an associated class label), the noise is the same or substantially similar for those images, although the spatial distribution of the noise in the training images 101 may vary from image to image. It is known, for example, that some neural networks have a bias towards learning simple, local patterns as corresponding with a given class label (so-called 'texture-bias'). Hence, this texture-bias can be exploited by introducing such texture into training images 101, so as to obscure a neural network's ability to learn the real image features that are representative of a given object class. An example of such texture bias is described in 'ImageNet-trained CNNs are biased towards texture; increasing shape bias improves accuracy and robustness', R. Geriho et al., University of Tubingen (https://arxiv.org/pdf/1811.12231.pdf), pages 1-22.

The image noise generator 105 may be configured to generate image noise that is imperceptible to the human eye. The noise may be imperceptible to the human eye by virtue of corresponding to variations in pixel intensity and/or colour of the original image that are too small to be noticed by the human eye. For example, typically, the human brain is able to perceive changes in the colour green over a finer scale compared with changes in the colour red. Hence, the image noise generator 105 may be configured to adjust the red values in an RGB image more, compared with the green values. Alternatively or in addition, the image noise generator 105 may be configured to generate a pattern in which the spatial distribution of pixel intensity and/or colour values is unlikely to be noticed by the human brain. To ensure that the noise imperceptible, it may be useful to ensure that the noise generated is a binary pattern or some other low-magnitude pattern.

It may be desirable to introduce imperceptible noise into the training images 101 so that they can still be used for their original purpose, which may not necessarily be for training an artificial intelligence. For example, it may be that the training images 101 are available to a content hosting platform (e.g. Facebook™, Instagram™, YouTube™, Twitch™, etc.), and that a third party intends to scrape the content hosting platform for images of a given type. Rather than providing the noisy images as part of a separate database, which may go ignored, the images 101 can be modified prior to being uploaded to the content-hosting platform. In this way, any images obtained from the platform by a malicious third party will automatically be modified.

Figure 2:
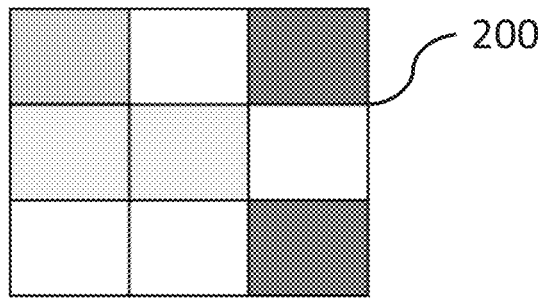
FIG. 2 shows schematically an example of a modification introduced to training images.
Figure 2:
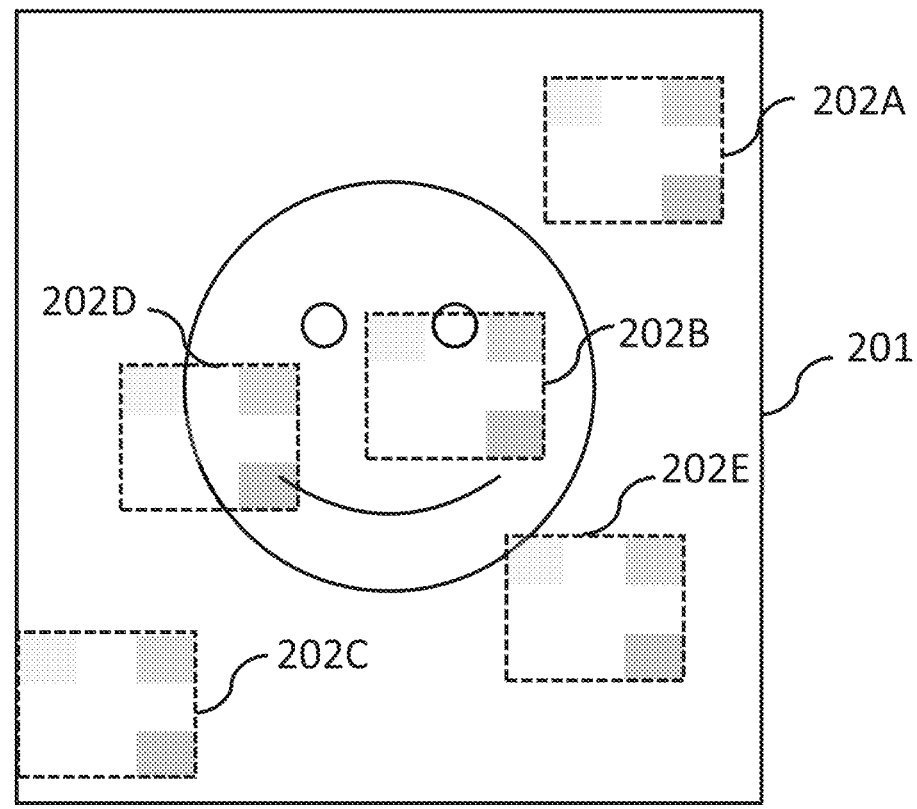

FIG. 2 shows schematically an example of a pattern 200 that may be generated by the image noise generator. In FIG. 2, the pattern 200 comprises a small 3×3 grid of pixels, with the relative change in pixel intensity being indicated by the corresponding shade of the pixel. Pattern 200 corresponds to a texture that may be introduced into the training images, so as to exploit a texture bias of a subsequently trained deep learning network.

In FIG. 2, the pattern 200 may have been generated by defining a range of integers, e.g. −3 to 3, and enumerating all of the possible patterns that can be obtained by putting of all of the possible values at the possible spatial locations. In the present example, this gives seven values in the −3 to 3 range (−3, −2, −1, 0, 1, 2, 3) to be placed at 9 possible locations, resulting in approximately 40 million ($7^9$) patterns that can be generated. As will be appreciated, patterns that contain too little variation may be removed from the possible set of patterns to be used. A pattern may contain too little variation if each pixel location has the same value (e.g. all 0s, all 1s, etc.) or only e.g. one or two of the pixel values have different values. In FIG. 2, the pattern 200 corresponds to matrix of {2, 0, 3; 1, 1, 0; 0, 0, 3}, where the individual values represent relative changes in e.g. pixel values. A pattern of all zeroes would correspond to no change to the original training image.

It will be appreciated that the pattern 200 shown in FIG. 2 need not necessarily be generated on an individual pixel level. For example, in FIG. 2, each unit of the grid may correspond to a group of pixels. In such examples, at least some units of the grid may contain different numbers of pixels than others. For such larger scale patterns, similarly the pattern need not necessarily have hard boundaries within the image; the matrix may represent the probability of a pixel perturbation within a corresponding grid area and hence an average density of perturbations within respective areas of the image. Similarly each value could represent a sinusoid peak of corresponding value, with boundaries representing toughs, so that any Fourier or other frequency based representation of the image used during training represents the values clearly without excess higher frequency components arising from hard value discontinuities at grid boundaries.

In some examples, the image noise generator 105 may be configured to generate the noise based on the class label associated with the training images 101 input to the input unit 102. Hence, in FIG. 1, the image noise generator 105 is shown as having an optional input from the label unit 103 (indicated in dashed). By generating the noise based on the class label, it can be ensured that the noise is the same for each of the training images 101 of a given class.

Alternatively, or in addition, the image noise generator 105 may be configured to generate noise based on the secret key. Hence, in FIG. 1, the image noise generator 105 is shown as having an optional input from the key unit 104. It may be, for example, that the training images 101 in a given set are associated with a single secret key and that this secret key is used to generate the noise that is to be introduced into the training images 101.

In examples where the image noise generator 105 is configured to generate the noise based only on a secret key, the secret key may optionally be class-specific. That is, a given set of training images, corresponding to same class or classes, are associated with a class-specific secret key. This ensures that class-specific information is introduced into the set of training images. The use of class-specific secret keys may provide enhanced security and flexibility, as the class label will be protected out of the dataset (i.e. not included as metadata). If a given set of training images are associated with multiple class labels, the secret key may be specific to the multiple class labels.

In some examples, the image noise generator 105 may be configured to generate noise based on a plurality of class-specific secret keys that are associated with a given training image (by virtue of the training image having a plurality of class labels associated therewith). In this way, the noise added to a given training image will be dependent on the plurality of class labels associated with that image, such that training images having the same combination of class labels will have the same noise introduced to them.

In some examples, the image noise generator 105 may be configured to generate the noise by applying a hash function to the class label and the secret key. Alternatively, the hash function may be applied to a class-specific secret key, where such a key is used by the image noise generator 105 to generate the noise.

Returning to FIG. 1, the encoding apparatus 100 optionally further comprises an image processor 106 operable to determine, based on the class label and/or key, or class-specific secret key, a plurality of locations at which the noise generated by the image noise generator 105 is to be applied to the training images 101. Hence, in FIG. 1, the image processor 106 is shown as receiving an input from the key unit and label unit. It will be appreciated that, where a class-specific secret key is used, the image processor 106 need not necessarily receive an input from the label unit 103, since the class information will be intrinsic to the corresponding class-specific secret key. Hence, in FIG. 1, the image processor 106 is shown as receiving an input from the label unit in dashed. Meanwhile, for noise patterns that span the whole image, as discussed previously herein, the pattern will typically be applied with reference to a common origin, e.g. (0,0) for whatever image representation is used during processing. For patterns applied within a Frequency domain, the pattern will typically be applied with reference to a common frequency among the finite set of frequency bins within the frequency representation.

In some examples, the spatial distribution of the noise may be the same for each of the training images 101 in a given set. That is, the same pattern may be introduced at the same locations for each set of training images 101 corresponding to a given class label.

However, in other examples, the spatial distribution of the pattern may vary from image to image in a given set of training images 101. It may be desirable to vary the spatial distribution of the pattern across the training images 101, such that an unauthorised party cannot simply remove the pattern from all of the training images 101 after having identified the pattern in one of the images. The variation in distribution of the pattern also limits an unauthorized parties' ability to attempt to guess the pattern by comparing all of the training images 101 in a given set.

In some examples, each training image may be associated with a respective key, and the image processor may be configured to determine a plurality of locations at which the generated noise is to be introduced into a training image based on the key and the class label associated with that training image. This may be repeated for each training image using the corresponding key and class label. However, as will be appreciated, the use of a different key for each training image will incur an extra computational cost in encoding the training images 101, as well as subsequently decoding them. Nonetheless, this may be preferred where security is paramount over the time taken to decode the training images. For example, the class and secret key may be used to generate the noise pattern so that it remains consistent for the machine learning system to learn, whilst the particular spatial distribution of copies of the pattern (202A-E) in each training image is responsive to the respective image key. In this way the image key is uniquely encoded in a manner that does not impair the generalised learning of the machine learning system.

In some examples, the noise may comprise a discrete pattern of variations in pixel intensity and/or colour intensity (as described above in relation to FIG. 2), that is to be added to N spatial locations in the training images 101. The image processor 106 may be configured to determine the locations for a given training image by applying N times a hash function to:

i. The class label (or more generally, all of the label information for the training image)
ii. the secret key
iii. a respective image key
iv. the previous application of the hash function.

As will be appreciated, where a class-specific secret key is used, the class label may not be required as an input to the hash function.

In the present disclosure, training images 101 that have had noise introduced into them are referred to as modified training images 107. FIG. 2 shows an example of a modified training image 201. In FIG. 2, the noise, consisting of a 3×3 pattern of pixel variations 200 has been applied to five different locations (e.g. taking the centre of each pattern as its location) within the training image. Although the noise is obvious in the modified image 201, it will be appreciated that this is for illustrative purposes only, i.e. so that the locations of the patterns can easily be seen despite not being perceptible in reality. In FIG. 2, five patterns 202A, 202B, 202C, 202D, 202E are shown at different respective locations. However, in some examples, the locations of the patterns may result in at least some overlap between the patterns.

It will be appreciated that, where the noise generated by the image noise generator 105 comprises a signal in the frequency domain, it may not be necessary to determine the locations at which the signal is to be applied as a separate step. For example, the locations may be implicit from the frequency of the signal (or filtering) applied to the training images. Hence, in some examples, the image noise generator

105 may perform both the functions of generating the noise and determining the locations in the training images in which that noise is to be applied.

In some examples, the spatial distribution of the pattern generated by the image noise generator may be pseudo-random. For example, the class label and secret key (or class-specific secret key) may correspond to a seed that is input to a pseudorandom number generator that forms part of the image processor 105. A corresponding pseudorandom number generator may be provided at a decoding apparatus, such that if the same seed is known, the spatial distribution generated by the image processor 105 can be determined.

By encoding the training images in the above described manner, an image classification model can be fooled into associating the noise with the class label for the training images. When faced with an image that does not include the pattern, the image classifier will be less likely to be able to identify the corresponding class label for the image. For generative adversarial networks, the introduction of the pattern will allow non-authorized use of the training images to be detected. This is because the copyright owner will be able to identify the pattern (since they will know what it is) in the used images, and thus confirm that an unauthorized use has taken place. In essence, the noise introduced into the training images provides a watermark that allows use to be detected, if not interfered with.

Figure 3:
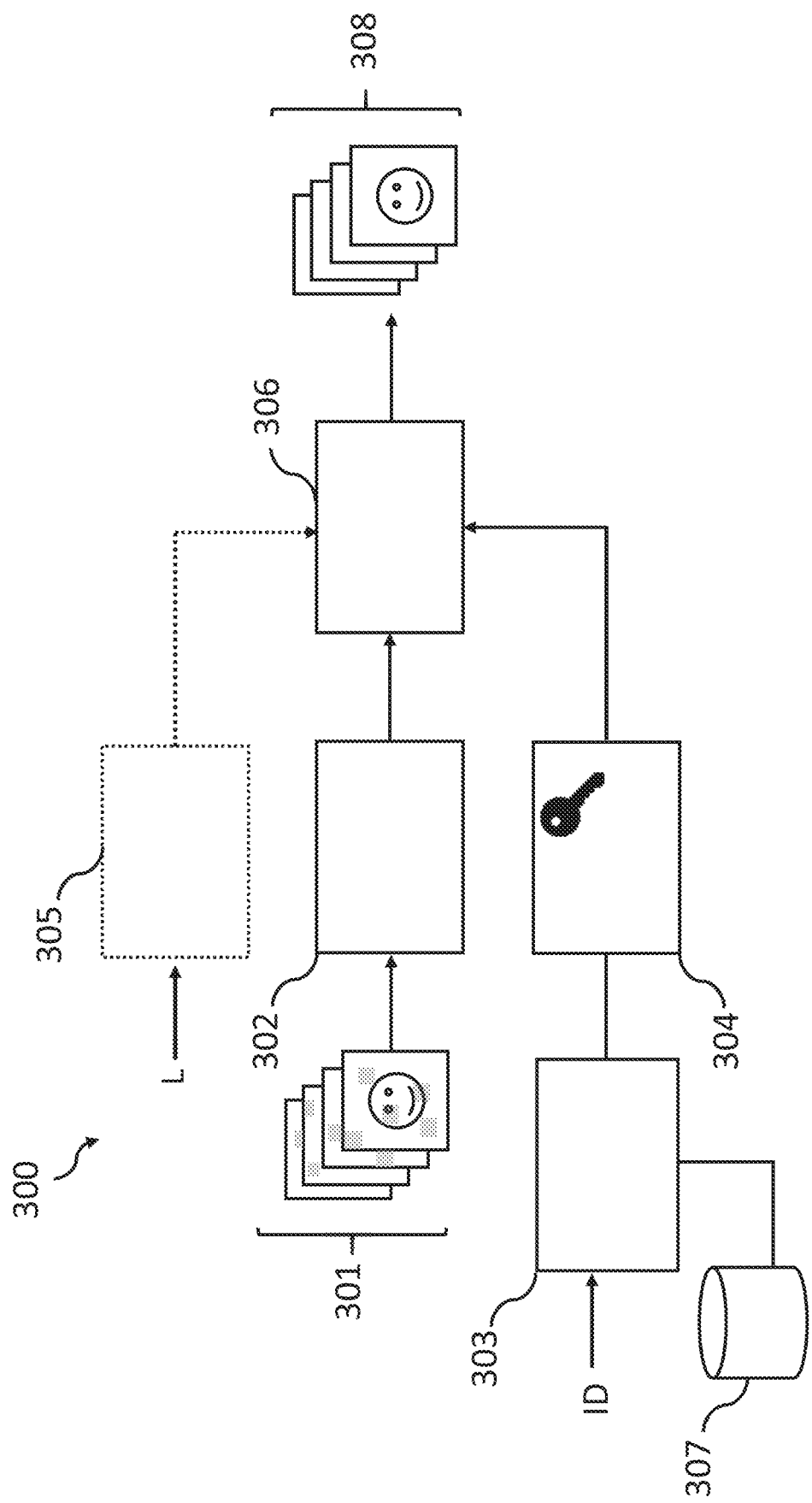
FIG. 3 shows schematically an example of a decoding apparatus for encoding training images.

FIG. 3 shows schematically an example of a decoding apparatus 300 for decoding modified training images 301. In FIG. 3, the decoding apparatus 300 is configured to decode the training images encoded by the encoding apparatus 100. The decoding apparatus 300 may correspond to software that is made available to a user, after the user having obtained a license (or permission) to use a set of training images. The decoding apparatus 300 comprises an input unit 302, authentication unit 303, decode key unit 304 and filtering unit 306. The operation of each unit is described below.

The input unit 302 is operable to obtain a plurality of modified training images 301. The modified training images 301 correspond to training images to which noise has been applied. The noise corresponds to a pattern that is specific to the class label associated with the modified training images 301. The spatial distribution of the noise in the images is dependent on the class label and secret key, or class-specific secret key, associated with the original training images (i.e. prior to modification). In some examples, the secret key may be class label specific and so the class label may not necessarily be needed as an input to the decoding apparatus 300. The modified training images 301 may be generated in any of the previously described manners.

The authentication unit 303 is operable to determine whether a user is authorized to possess and/or use the training images 301. The authentication unit 303 may be operable to receive an identifier, indicating an entity (e.g. user, server, company, etc.) that is intending to use the decoding apparatus 300 for decoding modified training images 301. The authentication unit 303 may be configured to compare this identifier with a database of identifiers for authorized entities, to determine whether the entity corresponds to an authorized identity. In FIG. 3, the database of authorized entities is indicated by database 307.

In some examples, a party may be required to enter a password to a login page in order to use the decoding apparatus, and the authentication unit 303 may be configured to determine whether correct login details have been provided by the party. A given party may be given login details after having obtained a license for using the training images, for example.

In other examples, the authentication unit 303 is operable to receive a client authentication certificate identifying a client that intends to use the decoding apparatus. The authentication unit 303 may process the authentication certificate so as to identify the certificate's source and whether the client should be allowed access to the functionality of the decoding apparatus 300. The source of the client certificate may be compared with a database of trusted sources, for example.

The decoding apparatus 300 also comprises a decode key unit 304 that is configured to obtain, in response to a determination that a user is an authorized user, a decode key for removing the noise from the modified training images 301. The decode key unit 304 may be operable to receive the decode key from the corresponding key unit of the encoding apparatus. For example, the decode key unit 304 and key unit may be in communication via a secure communications channel. Alternatively, both the key unit and decode key unit 304 may be in communication with an intermediate key generating device that is operable to distribute keys to the key unit and decode key unit 304. The decode key enables the noise and spatial distribution of the noise in the training images to be determined.

The decode key may correspond to the secret key that was used by the encoding apparatus to generate the modified training images 301. For example, where the key corresponds to a symmetric key (used in symmetric encryption). Alternatively, where the encoding apparatus used a public or private key for generating the modified training images 301, the corresponding private or public key may be obtained by the decode key unit 304. In embodiments where multiple keys are used to generate a set of modified training images 301, the decode key unit 304 may be configured to obtain multiple corresponding keys. The decode key may be class-specific, depending on whether the modified training images were generated using the class label and secret key, or a class-specific secret key.

The decoding apparatus 300 may also comprises a label unit 305 operable to obtain a class label associated with the modified training images 301. In some examples, the class label associated with the modified training images 301 may be provided with the images (e.g. defined as metadata). In such examples, a separate label unit 305 may not be required. In other examples, the class label may be received separately in an encrypted format, and the label unit 305 may be configured to decrypt the class label. The decryption may be performed using a public or private key, depending on the nature of the encryption used. As mentioned previously, the noise and spatial distribution of the noise may be generated based on the class label and so the decoding apparatus 300 may need to obtain the class label in order to remove the noise introduced into the training images.

However, as mentioned previously, in some examples the training images may have been generated using a class-specific secret key and so the decoding apparatus 300 may not need to comprise a label unit for obtaining the class label. For example, the class label may be intrinsic to the decode key obtained by the decode key unit, and so obtaining the decode key may be equivalent to obtaining class-specific information for the modified training images 301. It may be desirable to use a class-specific secret key for a given set of training images, so as to conceal the class label associated with the training images (since the noise and spatial distribution of the noise will depend on the class label). Hence, in FIG. 3, the label unit 304 is shown in dashed, along with the input to the filtering unit 306.

The decoding apparatus 300 further comprises a filtering unit 306 operable to receive an input from the decode key unit 304 and optionally, label unit 305, and in response thereto, filter the noise introduced by the encoding apparatus 100 into the training images. The filtering unit 306 is configured to determine what the noise is, i.e. the variation in pixel intensity and/or colour values that corresponds to the noise, and the spatial distribution of the noise in the images. Once this has been determined, the pixel intensities and/or colour values can be adjusted so as to correspond with their original values in the unmodified training images. Alternatively, the filtering unit may be configured to remove the pixels identified as corresponding to noise, although, as will be appreciated, this will result in loss of image information and may degrade the performance of a subsequently trained classification model.

In some examples, the filtering unit 306 is configured to determine a frequency of the noise introduced into the images. The frequency of the noise may (implicitly) define the variation in pixel intensity and/or colour as a function of spatial location within the image. As mentioned previously, the encoding apparatus may be configured to determine one or more frequencies with which the pixel intensity and/or colour is to vary based on the class label and secret key, or a class-specific secret key. Hence, decoding apparatus 300 may be configured to perform corresponding operations on the class label and decode key, or class-specific decode key, so as to determine the one more noise frequencies used to encode the training images Specifically, the filtering unit 306 may be configured to perform these operations based on the class label obtained by the label unit 305 and the decode key obtained by the decode key unit 304; or based on a class-specific decode key obtained by the decode key unit. This may involve, for example, representing a given training image in the frequency domain, and then removing any signals identified as having been added to the original training image. Where the system used frequency or other key-based information to drive probabilistic perturbations of individual pixels in the image, the filtering using can heal the image by identifying single pixels that have a value difference compared to their surrounding neighbours (e.g. deviation from a value trajectory across N pixels) and restore the value, effectively providing a smoothing function that is only applied to isolated pixels in an image. It will be appreciated that this particular approach may also alter the appearance of inherent noise, if present in an image.

Generally, the filtering unit 306 may be configured to determine the pattern of noise that has been applied to the image by using the obtained class label and/or decode key, or class-specific decode key, in a noise generation algorithm that corresponds with the noise generation algorithm used by the encoding apparatus. The output of the noise generation algorithm may correspond to the texture (i.e. pattern) that was introduced into the training images by the image noise generator of the encoding apparatus. The spatial distribution of the pattern in a training image may be determined by inputting the class label and decode key, or class-specific decode key, for a given training image to a function that corresponds with the function used by the image processor to determine the spatial distribution of the pattern in the modified images.

As mentioned previously, the image processor of the encoding apparatus may be configured to determine the locations at which a pattern is to be introduced into a training image by applying a hash function to the class label and secret key, or class-specific secret key, associated with the training images. The image processor of the encoding apparatus may be configured to determine N locations by applying the hash function to the class label, secret key and $N-1^{th}$ application of the hash function to the class label and secret key. As will be appreciated, where a class-specific decode key is used, the class label may not be required as an input to the hash function. The filtering unit 306 may have access to a hash function that corresponds with that used by the encoding apparatus 100 so as to determine the spatial distribution of the noise introduced into the modified training images.

If the encoding apparatus 100 uses a hash function to generate the noise and its spatial distribution, the filtering unit may be configured to apply a corresponding hash function to the secret key, and optionally class label (i.e. where a class-specific secret key is used) obtained by the decode key unit 304, and optionally, label unit 305.

In FIG. 3, the filtering unit 306 is shown as providing the original training images 308 as an output. That is, the images output by the filtering unit 306 correspond to the images input to the encoding apparatus, prior to any modification by the encoding apparatus. The images output by the decoding apparatus 300 may be suitable for training a machine learning model, since they will not (or are at least less likely to) to include textures or patterns that a machine learning model is likely to misidentify as corresponding with the class label. Thus, an authorised user should generally expect the training images to be suitable for training an artificial intelligence for recognizing subjects in the images.

Although not shown in FIG. 3, in some examples, the decoding apparatus 300 may comprise a machine learning module that is to be trained with the images output by the filtering unit 306. The machine learning module may be configured to determine a class label associated with the images output by the filtering unit 306. It may be for example, that the decoding apparatus 300 is provided with an image classification model (e.g. neural network) that is known to be suitable for performing image classification with the modified training images provided by a copyright owner.

Figure 4:
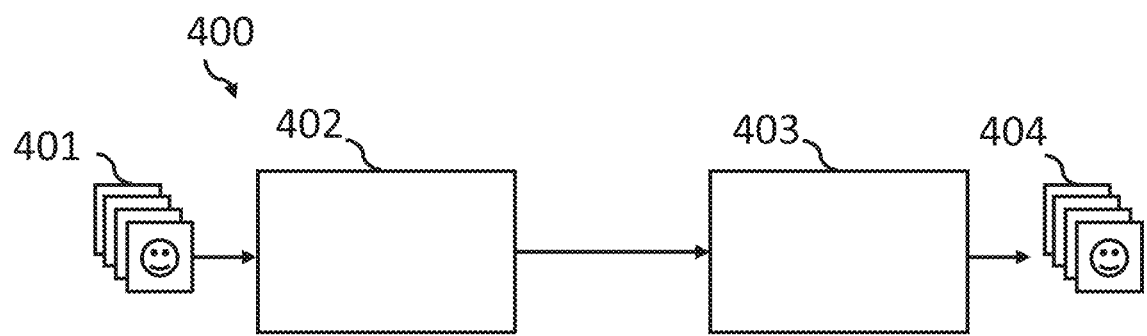
FIG. 4 shows schematically an example of system comprising an encoding apparatus and decoding apparatus.

FIG. 4 shows schematically an example of a system 400 for encoding and decoding training images. In FIG. 4, a set of training images 401 are shown as an input to an encoding apparatus 402. The encoding apparatus 402 corresponds to any of the previously described encoding apparatuses. The encoding apparatus 402 is shown as providing an output to a decoding apparatus 403. The output corresponds to a set of modified training images, the modification being performed in the above described manners. The decoding apparatus 403 corresponds to any of the previously described decoding apparatuses. In FIG. 4, the decoding apparatus 403 is shown as providing the original set of training images as an output. Generally, it is expected that an owner or distributor of training images 401 will be in possession of the encoding apparatus 402 and a recipient of the training images will request access to (or a copy of) the decoding apparatus 403.

It will be appreciated that the apparatus described herein may be carried out on conventional hardware suitably adapted as applicable by software instruction or by the inclusion or substitution of dedicated hardware. Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The invention claimed is:

1. An encoding apparatus comprising:
   an input unit configured to obtain a plurality of training images;
   a label unit operable to obtain a given class label associated with the plurality of training images, the given class label being the same for each of the plurality of training images and corresponding to a classification for image content included in each of the plurality of training images;
   a key unit operable to obtain a secret key for use in encoding the training images; and
   an image noise generator operable to generate, based on the obtained secret key, noise for introducing into the training images;
   wherein the image noise generator is configured to generate noise that correlates with the given class label associated with the plurality of training images and introduce the noise into each of the plurality of training images to obtain modified training images, wherein the encoding apparatus is configured to output the modified training images such that a machine learning model subsequently trained with the modified training images learns to identify the noise introduced into the modified training images as corresponding to the given class label.

2. The encoding apparatus according to claim 1, comprising an image processor configured to determine, based on the secret key, a spatial distribution in the training images at which the generated noise is to be applied, and to apply the generated noise in the determined distribution so as to generate the modified training images.

3. The encoding apparatus according to claim 1, wherein the key unit is operable to obtain a class-specific secret key, the class-specific secret key being specific to the class label associated with the training images.

4. The encoding apparatus according to claim 1, wherein the image noise generator is operable to generate the noise based on the secret key and the obtained class label.

5. The encoding apparatus according to claim 4, comprising an image processor configured to determine a distribution at which the generated noise is to be applied based on the secret key and the obtained class label.

6. The encoding apparatus according to claim 4, wherein the key unit is operable to obtain a plurality of secret keys, each secret key being associated with a respective training image; and
   wherein the image processor is operable to determine a plurality of spatial locations for introducing noise into each training image based on the class label and corresponding secret key for that training image.

7. The encoding apparatus according to claim 1, wherein the image noise generator is operable to generate image noise that is imperceptible to the human eye.

8. The encoding apparatus according to claim 1,
   wherein the image noise generator is configured to generate a pattern by varying at least one of pixel intensity and colour intensity of one or more pixels in the training images; and
   wherein the image processor is configured to determine a plurality of locations at which the pattern is to be introduced into the plurality of training images.

9. A system, comprising:
   an encoding apparatus, including:
   an input unit configured to obtain a plurality of training images,
   a label unit operable to obtain a given class label associated with the plurality of training images, the given class label being the same for each of the plurality of training images and corresponding to a classification for image content included in each of the plurality of training images,
   a key unit operable to obtain a secret key for use in encoding the training images, and
   an image noise generator operable to generate, based on the obtained secret key, noise for introducing into the training images,
   wherein the image noise generator is configured to generate noise that correlates with the given class label associated with the plurality of training images and introduce the noise into each of the plurality of training images to obtain modified training images, wherein the encoding apparatus is configured to output the modified training images such that a machine learning model subsequently trained with the modified training images learns to identify the noise introduced into the modified training images as corresponding to the given class label; and
   a decoding apparatus, including:
   an input unit operable to obtain a plurality of modified training images, the modified training images corresponding to training images to which noise has been applied, the noise correlating with a class label associated with the plurality of training images such that a machine learning model subsequently trained with the modified training images learns to identify the noise introduced into the training images as corresponding to the class label;
   an authentication unit operable to determine whether an entity is authorized to use the modified training images for training a machine learning model;
   a decode key unit configured to obtain, in response to a determination that the user is an authorized user, a decode key for removing the noise in the modified training images; and
   a filtering unit operable to receive an input from the decode key unit, and in response thereto, filter the noise from the modified training images so as to obtain an original version of the training images prior to modification by an encoding apparatus.

10. The system according to claim 9, wherein the decode key unit is configured to obtain, in response to a determination that the user is an authorized use, a class-specific decode key for removing the noise from the modified training images, the class-specific decode key being specific to a class label associated with the training images.

11. The system according to claim 10, wherein the filtering unit is operable to determine a spatial distribution of the noise in the training images based on the class-specific decode key.

12. The system according to claim 9, comprising a label unit operable to obtain a class label associated with the modified training images; and
   wherein the filtering unit is operable to receive an input from the decode key unit and label unit, and in response thereto, filter the noise from the modified training images so as to obtain an original version of the training images prior to modification by an encoding apparatus.

13. The system according to claim 12, wherein the filtering unit is operable to determine a spatial distribution of the noise in the training images based on the obtained class label and secret key.

14. The system according to claim 9, wherein the filtering unit is operable to determine, based on the inputs received at the filtering unit, a variation in at least one of pixel intensities and colour intensities that the noise corresponds to, and based thereon, remove the noise from the training images so as to recover the original training images prior to their modification.

15. The system according to claim 9, comprising a machine learning module configured to determine a class label associated with the images output by the filtering unit.

* * * * *